United States Patent
McQuade et al.

(10) Patent No.: US 6,375,137 B1
(45) Date of Patent: Apr. 23, 2002

(54) SUPPORT FOR MOUNTING ON A BRICK WALL

(76) Inventors: Donald Joseph McQuade; Joan Vivian Munks, both of 12 Victor Street Birkdale, Brisbane (AU)

( * ) Notice: Subject to any disclaimer, the term of this patent is extended or adjusted under 35 U.S.C. 154(b) by 0 days.

(21) Appl. No.: 09/601,026

(22) PCT Filed: Jan. 27, 1998

(86) PCT No.: PCT/AU99/00054

§ 371 Date: Jul. 26, 2000

§ 102(e) Date: Jul. 26, 2000

(87) PCT Pub. No.: WO99/38425

PCT Pub. Date: Aug. 5, 1999

(30) Foreign Application Priority Data

Jan. 29, 1998 (AU) .................................. 52820/98

(51) Int. Cl.[7] .................................................. A47F 5/00
(52) U.S. Cl. ................................... 248/205.1; 248/301
(58) Field of Search ......................... 248/205.1, 201, 248/220.21, 220.43, 222.52, 225.11, 301, 27.8, 217.1, 231.9

(56) References Cited

U.S. PATENT DOCUMENTS

| | | | |
|---|---|---|---|
| 1,955,476 A | * 4/1934 | Torgersen | ................... 248/208 |
| 2,202,412 A | 5/1940 | York | |
| 3,768,767 A | 10/1973 | Dobkowski | |
| 4,074,882 A | 2/1978 | Anderson | |
| 4,145,840 A | * 3/1979 | Davidson | ................. 248/217.2 |
| 4,337,915 A | * 7/1982 | Cali | ........................ 248/217.1 |
| 4,771,974 A | * 9/1988 | Carlson | .................... 248/231.8 |

FOREIGN PATENT DOCUMENTS

| | | |
|---|---|---|
| AU | 691156 | 5/1998 |
| AU | 692749 | 6/1998 |

* cited by examiner

*Primary Examiner*—Ramon O. Ramirez
(74) *Attorney, Agent, or Firm*—Madson & Metcalf

(57) ABSTRACT

Supporting apparatus (10) is mounted to a brick wall having mortar recesses (14, 18) between adjacent rows of bricks, for supporting a planter pot, hanging basket, garden hose or the like. Member (11) hangs adjacent the face of the brick wall with hook (13) at one end fitting in mortar recess (14) between brick (16) and adjacent upper brick (17). Member (12) has a distal end and a proximal end and is pivotally connected to member (11) at a position spaced from hook (13) by a distance equal to the height of brick (16). The proximal end of member (12) fits in mortar recess (18) between brick (16) and adjacent lower brick (19). Members (11, 12) cooperate in use to grip brick (16) between hook (13) and the proximal end of member (12) upon a weight being applied to the distal end of member (12).

12 Claims, 1 Drawing Sheet

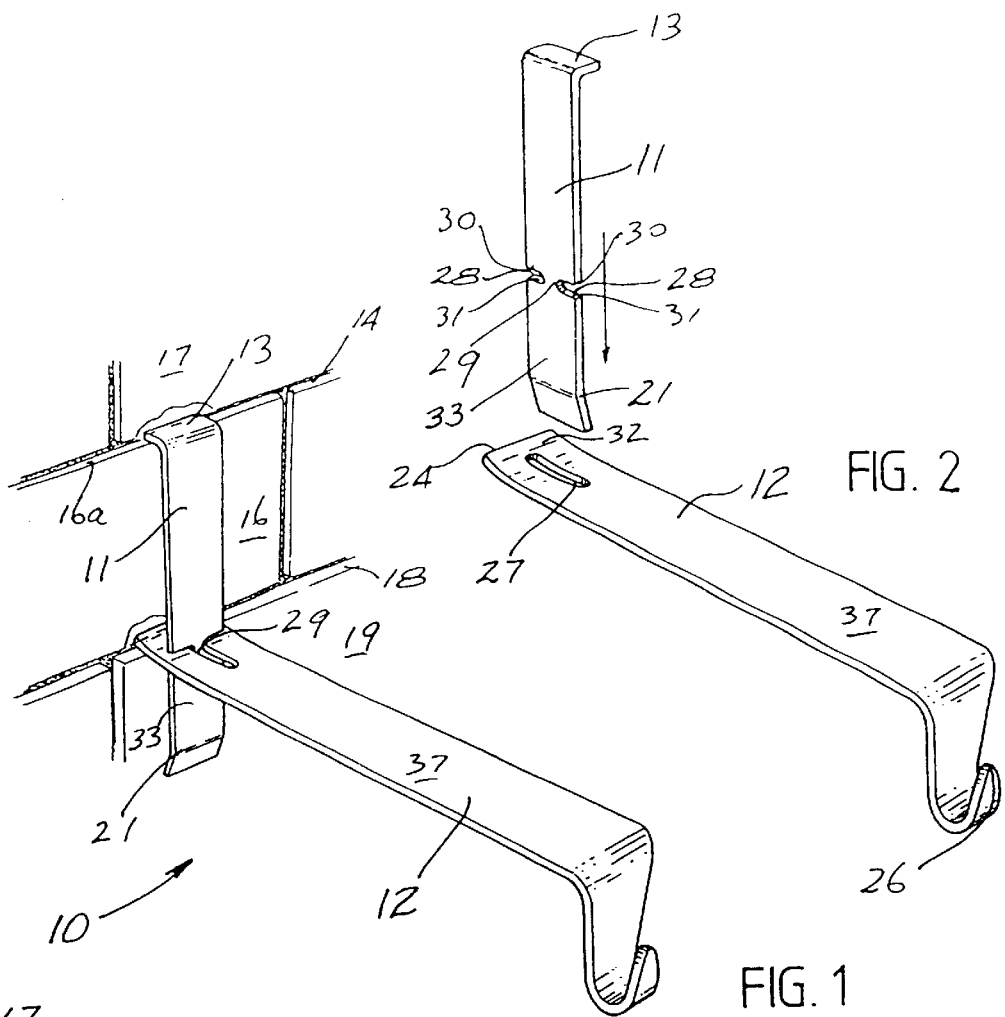
FIG. 1
FIG. 2
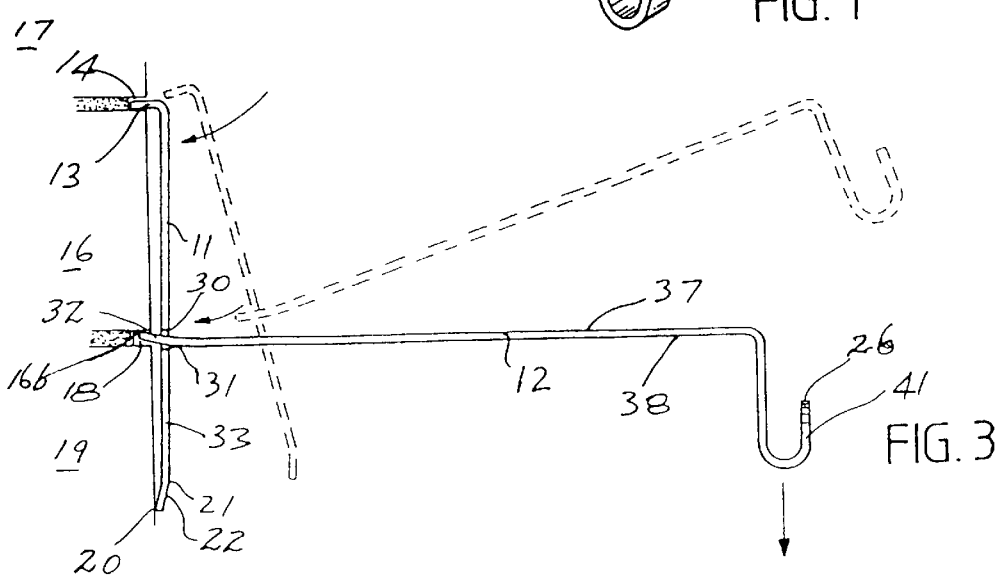
FIG. 3

SUPPORT FOR MOUNTING ON A BRICK WALL

TECHNICAL FIELD OF THE INVENTION

This invention relates to supporting apparatus of the type which can be mounted to a brick wall for supporting a potted plant, hanging basket, garden hose, or the like. Commonly such articles are supported by a triangular bracket which in turn is secured to the wall by bolts, screws or other suitable masonry anchors which result in a permanent defacement of the wall if the bracket is later moved.

BACKGROUND ART

U.S. Pat. No. 3,768,767 to Dobkowski describes an adjustable hanger for mounting to a brick wall which is adapted to grip a front portion of a brick in the wall by engaging the upper and lower faces within the mortar recesses immediately above and below the brick. Typically the recesses formed by a raked mortar joints are suitable for the hanger of Dobkowski. The hanger of Dobkowski includes two components, the first component being adapted to rest flat against the brick wall abutting the front faces of two vertically adjacent bricks and having a hook portion at its upper end adapted to fit in the mortar recess and engage the upper surface of the upper brick, and the second component being a lever which is pivotally mounted to the first component and passes through an aperture therein, the end proximal to the wall having a hook which is adapted to fit in the mortar recess and engage the lower face of the same brick. It will be appreciated that the two components act somewhat in the manner of a pair of scissor action pliers to grip the face edge portion of the brick by action of a weight applied to the distal end of the lever component. While the Dobkowski hanger would appear to work reasonably well, its manner of construction renders it generally cumbersome and not as aesthetically pleasing as is desirable. Furthermore, the manner in which the second component is pivotally mounted to the first component undesirably increases the cost of manufacture. Additionally, the Dobkowski hanger does not seem to be well suited for use with bricks which have front face irregularities or have not been accurately laid.

U.S. Pat. No. 4,074,882 to Anderson shows a supporting apparatus having two components which operate in a pliers-like manner similar to that of Dobkowski which is adapted for hanging planter pots from an upper window trim board or the like. One component is an L-shaped member adapted to hang from the window trim board with a hook on the free end of one leg of the "L" which engages the rear face of the trim board and the other leg of the "L" rests against the front face of the trim board and has a plurality of vertically spaced horizontal slots therein. The other component is a lever member which extends through a selected one of the slots with its proximal end engaging the underface of the window lintel below the trim board. A weight applied to the distal end of the lever member causes a clamping action on the trim board and the lintel. This apparatus is not suitable for use with a brick wall for a number of reasons and it would seem that any attempt to use it on such a wall would result in the lever member slipping out of the horizontal slot and the apparatus being released from the wall. Additionally the apparatus would be difficult to fit to a wall as it would be necessary to hold the L-shaped member and the lever member together in a predetermined relative position suitable for fitting in a mortar recess.

U.S. Pat. No. 1,955,476 describes a flower box holder which has two components which act in a similar manner to those of Dobkowski and Anderson. One component is a generally Ushaped member adapted to hang adjacent a timber wall with one leg of the "U" resting on the window sill and the other leg abutting the wall below the sill to hold the member generally plumb. The other component forms a loop which is adapted to surround the flower box, the loop having a lever portion which extends through an aperture provided in the middle leg of the U-shaped first component for pivotal movement to engage the windowsill in a pliers-like manner between the first leg of the "U" and the lever portion.

One object of the present invention is to provide supporting apparatus which may be manufactured at a reasonably low cost, yet will prove strong, stable and efficient in use. Another object is to provide a supporting apparatus which can be reliably used on brick walls which have irregular front faces and similarly on brick walls in which successive rows of bricks are not necessarily perfectly plumb or straight. Another object is to provide supporting apparatus which can be easily mounted on a brick wall but is aesthetically pleasing.

DISCLOSURE OF THE INVENTION

With the foregoing in view, this invention resides broadly in supporting apparatus adapted to be mounted to a brick wall having mortar recesses between adjacent rows of bricks, for supporting a planter pot, hanging basket, garden hose or the like, the apparatus including:

a first generally elongate member adapted to hang adjacent the front face of the brick wall and having a hook portion at or adjacent one end adapted to fit in the mortar recess between a first brick and the adjacent upper brick and to engage the upper surface of the first brick;

a second generally elongate member having a distal end and a proximal end adapted to be pivotally connected intermediate its ends to said first elongate member at a position spaced from said hook portion by a distance approximately equal to the height of the first brick, a portion adjacent the proximal end being adapted to fit in the mortar recess between the first brick and the adjacent lower brick and to engage the lower face of the first brick and the portion adjacent the distal end being adapted to support a weight, characterized in that said second elongate member includes a slot and said first member includes a tongue portion adapted to be received in said slot upon pivoting of said first elongate member generally about its longitudinal axis to a predetermined position and said first elongate member includes retaining means for retaining said first and second elongate members pivotally connected upon said first elongate member being pivoted to a second predetermined position angularly spaced from said first predetermined position, said first and second members cooperating in use when said first elongate member is in said second predetermined position to grip the first brick between said hook portion and said proximal end portion upon weight being applied to said distal end portion of said second elongate member.

Preferably, both the first and second elongate members are formed from flat bar or plate and are substantially rectangular in cross section, although it will be appreciated that the width of each member may change along its length. In its most simple form, each member is formed from plane rectangular steel bar and in one example, the first member is formed from 25 mm by 3 mm bar and the second member from 32 mm by 5 mm bar which is found to provide satisfactory support for most articles for which the apparatus is intended to be used. It will be appreciated that such form of the invention minimizes the number of components and allows for ease of manufacture thus minimizing cost. In such form of the invention it is preferred that said retaining means be formed by providing two opposed recesses in the edge portions of the first elongate member to create a link portion therebetween, the portion of said first elongate member between said recesses and said other end forming said tongue portion. In this form of the invention it will be appreciated that the width of the link portion is slightly less than the width of the slot to allow pivoting of said first elongate member from said first predetermined position to said second predetermined position. It will also be appreciated that the width of the slot must be slightly greater than the thickness of said tongue portion and the length of the slot must be at least slightly greater than the width of said tongue portion to allow it to be received therein. In such form it is also preferred that said slot extends longitudinally of said second elongate member and thus is effective to allow for selectively varying the position of the second member relative to the first member in use to accommodate different depth mortar recesses. Preferably, said slot is arranged to terminate a distance from the proximal end of the second elongate member approximately equal to the length of said hook portion so that in the normal most common operation of the apparatus a user may simply connect the two members and slide the first member in the slot towards the proximal end as tar as possible and then fit the hook and the proximal end portion into the respective mortar recesses.

Preferably said first elongate member includes spacing means as its other end for concentrating the lower vertically adjacent brick and for spacing the part of the elongate member intermediate said hook portion and said other from the face of the first block. Advantageously, the inclusion of said spacing means allows the apparatus to be used on brick walls with front face irregularities without diminishing the gripping force applied by the hook portion and the proximal end portion to the first brick. Preferably, said spacing means is arranged along the length of the first elongate member such that it engages the adjacent lower brick about mid-height thus achieving relatively high stability. In a preferred form of the invention in which said spacing means is formed by bending the end portion adjacent said other end, said other end is adapted to engage the adjacent lower brick at approximately mid height.

According to another aspect of the present invention there is provided a support assembly for a brick wall having mortar recesses between adjacent rows of bricks, the support assembly including first and second elongate members, with the first elongate member having an upper end with a hook means for engagement in a first horizontal mortar groove between two courses of bricks and being adapted to be disposed generally vertically with respect to a brick wall face, the second elongate member having a proximal end with an end face for engagement in a second lower horizontal mortar groove and being adapted for connection to the first elongate member to extend laterally with respect to the first elongate member from the brick wall face, with a distal end of the second elongate member being adapted to support a predetermined load, and wherein the first elongate member has an inwardly directed lower end adapted to abut the brick wall face below the second mortar groove to space a central portion of the first elongate member away from the brick wall face.

BRIEF DESCRIPTION OF THE DRAWINGS

In order that the invention may be more readily understood and put into practical effect, reference will now be made to the accompanying drawings in which:

FIG. 1 is a pictorial representation of supporting apparatus according to the invention in the in-use position mounted to a brick wall;

FIG. 2 a pictorial representation of the apparatus of FIG. 1 with the first and second elongate members of the apparatus in pre-assembled dispositions; and FIG. 3 is a side elevation view of the apparatus of FIG. 1 with the brick wall shown in section to illustrate the manner in which the apparatus is mounted and the manner of fitting the apparatus to the wall being shown also in dotted outline.

DETAILED DESCRIPTION OF THE DRAWINGS

The support apparatus 10 illustrated in the drawings includes two components, a first generally elongate member 11 constructed of 25 mm by 3 mm steel bar and a second generally elongate member 12 constructed of 32 mm by 5 mm steel bar, the second member being pivotally connected to the first member as will be described in more detail later. The first member has a hook portion 13 at its upper end adapted to fit in the recess 14 between a first brick 16 and a second brick 17 above the first brick and to abut the upper surface 16a of the first brick so that the first member may hang from the upper surface adjacent the front face of the wall with its lower end 20 abutting a third brick 19 immediately below, slightly lower than halfway down its height at line 23. Near to its lower end the first member has a bend 21 with the portion between the bend and the end 20 forming a spacer portion 22 and the portion above the bend forming a bridging portion, the spacer portion being adapted to keep the bridging portion spaced from the front face of the first and third bricks thus accommodating any irregularities in the respective front faces. Two opposed recesses 28 are proved in the edges of the first member at a distance approximately equal to the height of the first brick from the hook portion, thus separating the first member into an upper portion and a lower portion joined by a link portion 29 between the two recesses, the edges of the recesses forming two pairs of spaced apart shoulders 30 and 31 on the upper and lower portions respectively. Recesses of the type shown as recess 14 are commonly found on the walls of brick dwellings in Australia and elsewhere and are created by raking the joint when laying the bricks as will be understood by those skilled in the art. A similar recess 18 can be seen between the first brick and the third brick. If the apparatus is to be mounted to a wall which does not have suitably raked joints, then a recess can be created by chiseling away some of the mortar.

The second member 12 has a proximal end 24 and a distal end 26, the distal end being the end remote from the brick wall. A slot 27 is provided in the second member near to the proximal end and extending longitudinally of the member axially therewith, the portion between the end of the slot and the proximal end forming a proximal end portion 32. The slot is slightly greater in length than the width of the first member having a length of approximately 33 mm in this case. The width of the slot is slightly greater than the thickness of the first member, in this case being approximately 5 mm. It will be seen that the first member is adapted to be fitted in the slot upon pivoting to the position shown in FIG. 1 in which the 25 mm width lies in the same plane as the longitudinal axis of the second member in line with the slot. The link portion 29 of the first member has a width slightly smaller than the width of the slot 27 thus allowing the first member to be pivoted through 90 degrees once the first member is inserted in the slot to a position in which the link portion is within the slot and the shoulders 30 and 31 abut or are immediately adjacent the upper and lower faces 37 and 38 of the second member respectively. Once the first member has been pivoted through 90 degrees to the position shown in FIG. 1, the proximal end portion 32 together with the hook portion 13 of the first member coact to form a spaced apart pair of jaws adapted to grip a front portion of the first brick 16 therebetween by engaging its upper and lower faces 16a and 16b respectively. To assist with the gripping action the proximal end portion 32 is bent slightly upward about a line extending thereacross in line with the proximal end of the slot. It will be understood that engagement of the upper and lower shoulders 30 and 31 with the upper and lower faces 37 and 38 of the second member allows limited up and down pivoting movement of the second member relative to the first member, in use, in a scissor-like action.

A generally U-shaped hook 41 is formed adjacent the distal end 26 for attachment of a plant pot, hanging basket or the like. Other shaped hooks or devices may be provided at or near the distal end for accommodating other articles, such as garden hoses and shelves as desired.

In order to mount the apparatus to a brick wall, the first member is first pivoted to the position shown in FIG. 1 in alignment with the slot 27 and then slid into the slot until the recesses 28 align with the slot, the lower portion forming a tongue 33, whereupon it is pivoted through 90 degrees to the position shown in FIG. 2, the shoulders 30 and 31 engaging the upper and lower surfaces 37 and 38 respectively thus holding the two members together. The second member is then pivoted upwardly relative to the first member so that the hook portion 13 and the proximal end portion 31 move apart at their ends to their open position whereupon the hook portion and the proximal end portion may be fitted into the respective mortar recesses 14 and 18. It will be appreciated that in the assembled state the relationship of the slot 27 and the link portion 29 is such that the first member has limited sliding movement in the slot and mounting to the wall is relatively straight forward. The length of the slot allows relative adjustment of the second member relative to the first member to accommodate some variation in depth of recesses 14 and 18. Once the apparatus is mounted to the wall, a planter pot or the like can be hung from the hook 41, the weight of the planter pot being effective to ensure that the hook portion 13 and proximal end portion 31 grip the brick 16 therebetween.

While supporting apparatus as described and illustrated will be found very effective, it will be appreciated that the embodiment has been given by way of illustrative example only and may be subject to modification of constructional detail and design. Any such modifications are deemed to fall within the broad scope and ambit of the invention as defined by the appended claims.

What is claimed is:

1. A support assembly for a brick wall having mortar recesses between adjacent rows of bricks, the support assembly including first and second elongate members, with the first elongate member having an upper end with a hook means for engagement in a first horizontal mortar groove between two courses of bricks and being adapted to be disposed generally vertically with respect to a brick wall face, the second elongate member having a proximal end with an end face for engagement in a second lower horizontal mortar groove and being adapted for connection to the first elongate member to extend laterally with respect to the first elongate member from the brick wall face, with a distal end of the second elongate member being adapted to support a predetermined load, and wherein the first elongate member has an inwardly directed lower end adapted to abut the brick wall face below the second mortar groove to space a central portion of the first elongate member away from the brick wall face.

2. A support assembly as claimed in claim 1 wherein the central portion is adapted to be inclined slightly inwardly from the upper end to the lower end.

3. A support assembly as claimed in claim 1 wherein the second elongate member is able to move laterally with respect to the first elongate member when connected therewith to enable the second elongate member to engage in the second mortar groove.

4. A support assembly as claimed in claim 1, wherein the hook means comprises an upper end which is inwardly and downwardly directed relative to the central section.

5. The support assembly according to claim 4 wherein the second elongate member is able to be moved laterally with respect to the first elongate member in order to engage the end face in the second mortar groove.

6. The support assembly as claimed in claim 5 wherein the second elongate member is adapted to be pivoted downwardly with respect to the first elongate member to mount the support assembly to the brick wall.

7. The support assembly as claimed in claim 6 wherein the first elongate member has shoulder portions to limit downward pivoting movement of the second elongate member.

8. The support assembly as claimed in claim 5 wherein the first and second elongate members are adapted to be connected together by insertion of one member through aperture means of the other.

9. The support assembly as claimed in claim 8 wherein the first elongate member central section includes the aperture means and is adapted to slidably receive part of the second elongate member therethrough.

10. The support assembly as claimed in claim 8 wherein the aperture means includes upper and lower shoulder portions against which the second elongate member is adapted to abut when the support assembly is mounted to the brick wall.

11. The support assembly as claimed in claim 10 wherein the aperture means includes a hole through the second elongate member.

12. The support assembly as claimed in claim 11 wherein each of the first and second elongate members comprise portions which are adapted to pass through part of the other elongate member.

* * * * *